Dec. 13, 1949    M. W. CULLEN    2,490,783
RATIO DEMONSTRATOR FOR PLANETARY GEARING
Filed June 25, 1947

Inventor
Marion W. Cullen
By: *[signatures]*
Attorneys

Patented Dec. 13, 1949

2,490,783

UNITED STATES PATENT OFFICE 2,490,783

RATIO DEMONSTRATOR FOR PLANETARY GEARING

Marion W. Cullen, Washington, D. C.

Application June 25, 1947, Serial No. 757,043

1 Claim. (Cl. 74—801)

(Granted under the act of March 3, 1883, as amended April 30, 1928; 370 O. G. 757)

The invention described in the following specification and claim may be manufactured and used by or for the Government for governmental purposes without the payment to me of any royalty thereon.

My invention relates to devices for demonstrating the ratios of gearing, particularly planetary gearing.

In designing such gearing and in the instruction of students in the operation of the same, much difficulty is encountered by the designer and students in visualizing the exact action of the parts and the ratios involved. Obviously an actual planetary gearing assembly is too bulky, too heavy and too expensive for constant use by designers, study by students and demonstration by instructors.

With the foregoing in view, it is an object of my invention to provide a demonstrator which is formed of light sheet materials and which will be substantially flat whereby it may be transported and used with ease and will be relatively inexpensive to manufacture.

A further object is to provide an improved demonstrator for planetary gearing.

A further object is to provide an improved demonstrator of this type which comprises a section of sheet material having a central portion cut out to provide an internally toothed ring gear, a spider or cage comprising two pieces of sheet material mounting a sun and at least one planet gear therebetween and in operative relation to said ring gear, said demonstrator including means for maintaining the planetary and sun gears in operative position relative to said ring gear and there being handle means carried by the several parts to permit certain elements of the devices to be held stationary while other elements are rotated relative thereto.

Other objects and advantages reside in the particular structure of the device and in the combination and arrangement of the several parts, all of which will be readily apparent to those skilled in the art upon reference to the drawing and to the specification which follows and wherein the invention is shown, described and claimed.

Figure 1:
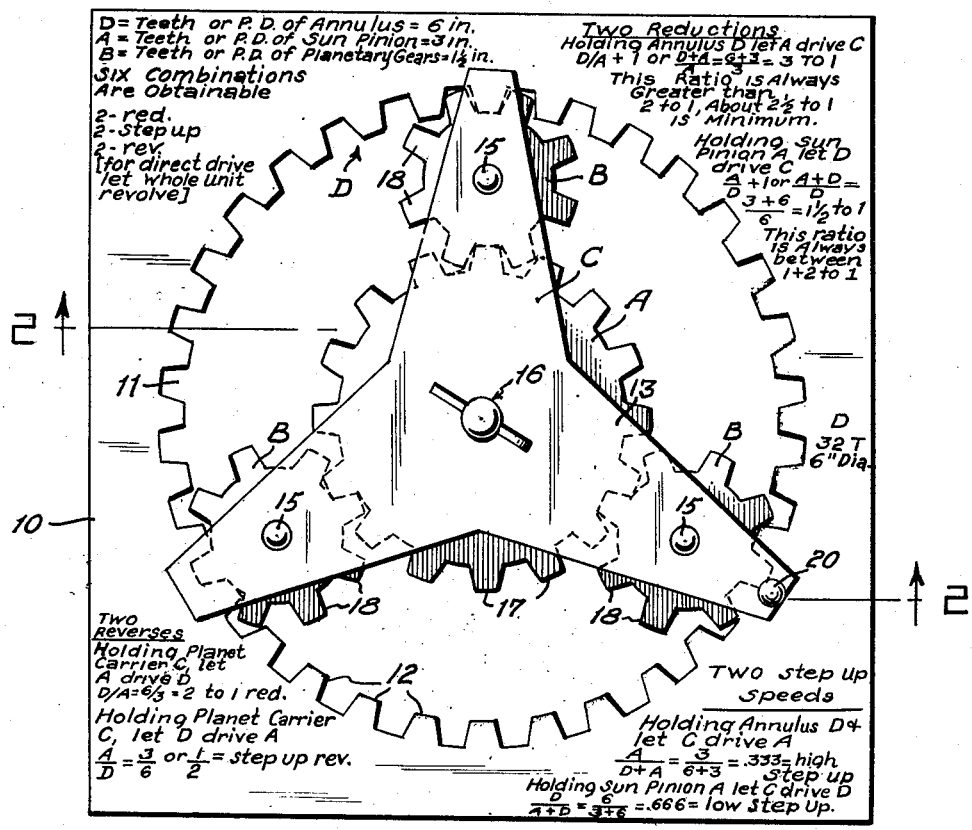
Figure 1 is a plan view of a preferred embodiment of the invention.

Referring specifically to the drawing wherein like reference characters have been used throughout to designate like parts, 10 designates a rectangular sheet of any suitable material such as cardboard, plastic or metal having a central aperture 11 formed therein the periphery thereof being formed with teeth 12 to form an internally toothed ring gear D. Suitable formulae and operating directions may be formed and provided on the upper surface of the sheet 10.

Figure 2:
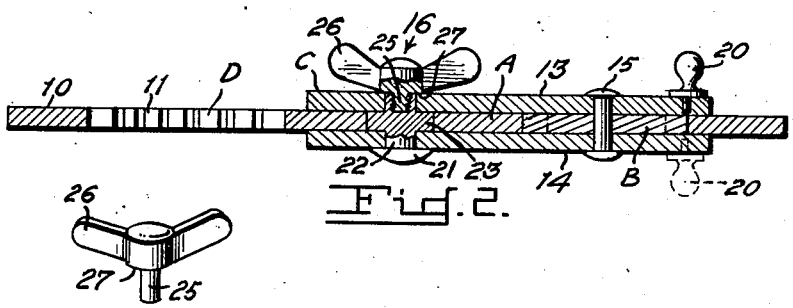
Figure 2 is a vertical section taken substantially on the plane of the line 2—2 of Figure 1.

In the form shown a spider or planet carrier C is formed of upper and lower tricorn-shaped pieces 13 and 14 of sheet material. The arms of the spider C are of a sufficient length to permit the free ends thereof to extend radially outwardly beyond the roots of the teeth 12 of the ring gear D. A handle 20 is detachably secured in any suitable manner to one arm of the spider adjacent the free end thereof. Handle 20 is shown attached to the upper spider portion 13. However, it may alternatively be attached to the lower spider portion 14 as shown in broken lines, Figure 2.

A plurality of planet gears B are mounted for free rotation between the upper and lower spider portions 13 and 14 by any suitable fastening means 15.

A sun gear A is mounted for free rotation between the upper and lower spider portions 13 and 14 axially thereof by the means 16, to be described later.

In the assembled position, as shown in Figure 1, the teeth 17 of the sun gear A are in mesh with the teeth 18 of the planet gears B while the teeth of the latter are in mesh with the teeth 12 of the ring gear D.

Figure 3:
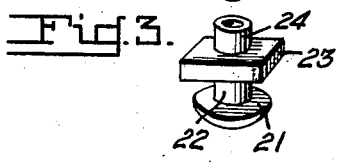
Figure 3 is a perspective view of a detail showing the parts in a separated position.

The means 16 (Fig. 3) which holds the sun gear A in position, comprises a head 21 engaging the outer surface of the lower spider portion 14, a spindle portion 22 freely rotatable in the lower spider portion, a squared portion 23 keyed in a like-shaped aperture axially formed in the gear A and a second spindle portion 24 which is freely rotatable in the upper spider portion 13. The upper end of portion 24 is axially bored and tapped to receive the threaded stud 25 of a handle 26 which has a shoulder portion 27 which overlies the upper surface of the upper spider portion 13 to retain the same in position.

The spider portions 13 and 14 are of sufficient rigidity and are sufficiently closely spaced as to have a sliding engagement with the surfaces of the base sheet 10 whereby to maintain the several gears in operative mesh with each other.

In operation, if it is desired to demonstrate the first of the reduction ratios set forth in the upper right hand corner of the sheet 10, the ring gear D is held stationary and the handle 26 is turned in a clockwise direction whereby to cause the sun gear A to rotate the planets B and drive the spider C in a clockwise direction at a slower speed than that of the sun gear. The second of such reduction ratios is accomplished by a reverse procedure whereby the sun gear is held stationary by means of the handle 26 and the ring gear D is rotated whereby to drive the planets B and cause the spider C to rotate around the sun gear in the same direction as the ring gear D but at a reduced speed.

To demonstrate the first of the two step up speed formulae set forth in the lower right hand corner of sheet 10, the ring gear D is held stationary and the spider C is rotated by the handle 20 whereby the planets B are rotated on the ring gear D to drive the sun gear A in the same direction as the spider C but at an increased speed. The second step up formula is best demonstrated by attaching the handle 20 to the lower spider member 14, as illustrated in broken lines, Figure 2, and rotating the spider C thereby while holding the sun gear stationary by the handle 26, whereby the planets B are rotated on the sun gear A and drive the ring gear D in the same direction as the spider C but at an increased speed.

The first of the two reverse speed formulae set forth in the lower left hand corner of the sheet 10 is demonstrated by holding the spider C stationary by means of the handle 20 and turning the handle 26, whereby the sun gear A rotates the planets B and causes them to drive the ring gear D in a direction reverse to that of the sun gear but at a reduced speed. The second reverse formula is demonstrated by holding the spider C stationary by means of the handle 20 and rotating the ring gear D whereby to rotate the planets B and cause the same to rotate the sun gear A in a reverse direction to that of the ring gear but at an increased speed.

While I have shown a device comprising three planet gears, it is obvious that any number may be used from one on up. However, if but a single planet gear is used a suitable backing member must be substituted for the lower spider member 14 and fixed to the sheet 10 to maintain the sun gear in an operative position.

In the gearing shown, the planet gears have eight (8) teeth, the sun gear has sixteen (16) teeth and the ring gear has thirty-two (32) teeth. However, any tooth ratio may be used and the relative size of the sun and planet gears with respect to the ring gear may be varied from those shown on the drawing.

With the device in hand it is comparatively easy to demonstrate the standard mathematical formulae set forth on the sheet 10 and a designer of planetary gearing can readily obtain the desired speed ratios by substituting various values for those of the gears A, B and D of the demonstrator. In like manner a student can get first hand knowledge of the operation of planetary gearing without it being necessary to use heavy, bulky and expensive full scale gearing.

While I have shown and described what is now thought to be the preferred embodiment of my invention, it is to be understood that the same is susceptible of other forms and expressions. Consequently, I do not limit myself to the precise structure shown and described except as hereinafter claimed.

I claim:

In an educational appliance for demonstrating the operation of a planetary differential, a sheet of material having a circular aperture having a toothed periphery forming an internal gear, first and second identical, generally triangularly-shaped spiders each having its apices contacting a respective side of said sheet when positioned centrally over said aperture, a sun gear of lesser diameter than said central aperture and having a non-circular hole through its center, a pivot pin having a central enlarged hub fitting said non-circular hole and having its ends journaled in central apertures in said spider, three planetary gears each journaled in and between said spiders in equally spaced relation about said pivot pin, each said planetary gear being in mesh with said internal gear and sun gear, the apical portions of said spiders contacting said sheet at opposite sides thereof, respectively, to thereby maintain all said gears in assembled meshing relation and against relative axial displacement, each said spider being cut away to define three equally-spaced radial arms and disclosing between said arms substantial portions of the peripheries of all said gears, and handle means exterior of one said spider and affixed to one end of said pivot pin whereby said sun gear may be directly turned.

MARION W. CULLEN.

REFERENCES CITED

The following references are of record in the file of this patent:

UNITED STATES PATENTS

| Number | Name | Date |
| --- | --- | --- |
| 846,549 | Clark | Mar. 12, 1909 |
| 1,418,224 | Arthurs | May 30, 1922 |
| 1,531,294 | Johnson | Mar. 31, 1925 |
| 2,016,149 | Leach | Oct. 1, 1935 |
| 2,407,975 | Christian | Sept. 24, 1946 |